United States Patent
Hatakeyama

[11] Patent Number: 5,944,156
[45] Date of Patent: Aug. 31, 1999

[54] POWER TRANSMISSION MECHANISM

[75] Inventor: Hideharu Hatakeyama, Isesaki, Japan

[73] Assignee: Abbott Laboratories, Abbott Park, Ill.

[21] Appl. No.: 09/070,963

[22] Filed: May 4, 1998

[30]     Foreign Application Priority Data

May 8, 1997  [JP]  Japan ..................................... 9-117652

[51] Int. Cl.⁶ .............................. F16D 23/00; F16D 3/14; F16D 3/52
[52] U.S. Cl. ........................... 192/56.5; 192/209; 464/81; 464/85
[58] Field of Search ................................. 192/56.5, 56.4, 192/209; 464/81, 82, 83, 85, 89

[56]                References Cited

U.S. PATENT DOCUMENTS

| | | | |
|---|---|---|---|
| 1,286,615 | 12/1918 | Hatashita | 464/81 X |
| 2,045,227 | 6/1936 | Hamill | 464/85 X |
| 2,088,979 | 8/1937 | Stanley | 192/209 |
| 2,910,846 | 11/1959 | Butterfield et al. | 192/56.5 X |
| 3,554,045 | 1/1971 | Littmann | 464/83 X |
| 4,344,306 | 8/1982 | Citron . | |
| 4,694,944 | 9/1987 | Schmidt | 192/56.5 |
| 4,744,447 | 5/1988 | Kato et al. | 192/56.5 |

FOREIGN PATENT DOCUMENTS

| | | |
|---|---|---|
| 0702167A1 | 3/1996 | European Pat. Off. . |
| 63-142460 | 9/1988 | Japan . |
| 639105 | 10/1994 | Japan . |
| 08135752 | 5/1996 | Japan . |
| 8135752 | 5/1996 | Japan . |

*Primary Examiner*—Charles A Marmor
*Assistant Examiner*—Roger Pang
*Attorney, Agent, or Firm*—Mona Anand

[57] ABSTRACT

A power transmission mechanism which is adapted to completely interrupt power transmission when a torque exceeds a predetermined value, and which has a simple configuration and is manufactured at low cost, and which is bidirectionally rotatable. When a torque, whose magnitude is not more than the predetermined value, is transmitted from a pulley (1) to a shaft (4), each of three elastic members is accommodated in such a manner as to extend over both of a holding portion (3) of the pulley and a holding part (6) of a hub (5). When an excessive torque, whose magnitude exceeds the predetermined value, is applied to the pulley, deformation of each of the elastic members is gradually enhanced by a compressive force applied from the pulley in a radial direction, so that each of the elastic members moves in the radial direction. Then, each of the elastic members further advances and is detached from a corresponding one of the holding portion of the pulley. Subsequently, each of the elastic members passes through a restriction portion 8 provided in a corresponding one of the holding part of the hub. Finally, each of the elastic members is accommodated in an inner portion (9) of the corresponding one of the holding part. Consequently, the transmission of the torque from the pulley to the hub is completely interrupted.

4 Claims, 5 Drawing Sheets

POWER TRANSMISSION MECHANISM

BACKGROUND OF THE INVENTION

1. Field of the Invention

The present invention relates to a power transmission mechanism to be used as a torque limiter for use in a compressor, general industrial equipment and so forth.

2. Description of the Related Art

First, a power transmission mechanism (hereunder sometimes referred to as a first conventional mechanism) for use in a compressor, which is described in Japanese Examined Utility Model Publication (JP-Y) No. 39105 of 1994, will be described hereinbelow by referring to FIGS. 1A to 1C.

A pulley 25 is rotatably mounted on a front nose 23 of a housing 22 of a compressor 21 through a bearing 24. Further, a rotation transmission plate 27 is fixed to a shaft 26 of the compressor 21. Moreover, synthetic resin destructible elements 28, which may be destructed by overload, are fixed to the rotation transmission plate 27 at four places, respectively. Incidentally, an end portion of each of the destructible elements 28 is inserted into a corresponding one of holes 25A respectively bored in the pulley 25 at the four places.

As a result of configuring the mechanism in this manner, when an abnormality occurs in the compressor 21 and a torque, whose magnitude exceeds a predetermined value, is applied to the rotation transmission plate 27, the destructible elements 28 are destructed. Thus, power is not transmitted from the pulley 25 to the rotation transmission plate 27. Consequently, the power transmission mechanism is protected.

Next, another power transmission mechanism (hereunder referred to as a second conventional mechanism) for use in a compressor, which is described in Japanese Unexamined Utility Model Publication (JP-U) No. 142460 of 1988, will be described hereunder by referring to FIGS. 2A and 2B.

A pulley 35 is rotatably mounted on a front nose 33 of a housing 32 of a compressor 31 through a bearing 34. Further, a hub 37 is fixed to a shaft 36 of the compressor 31. Moreover, each of drive levers 39 is attached to the hub 37 at a corresponding one of four places in such a way as to be able to rotate around a corresponding one of rivets 38. Furthermore, four engaging recess parts 37A are provided in the outer peripheral portion of the hub 37. A ring-like metallic plate spring 40 is disposed on the outer periphery of the hub 37 in such a manner as to be fit into the engaging recess parts 37A, respectively. An inner-end round engaging portion 39A of each of the drive levers 39 engages a corresponding one of the engaging recess parts 37A of the hub 37 through the plate spring 40. Further, an outer-end round engaging portion 39B of each of the drive levers 39 engages a corresponding one of engaging recess parts 35A of the pulley 35.

As a consequence of such a configuration of this mechanism, when an abnormality occurs in the compressor 31 and a torque, the magnitude of which exceeds a predetermined value, is applied to the hub 37, each of the drive levers 39 rotates around a corresponding one of the rivets 38. Thus, each of the inner-end round engaging portions 39A disengages from the corresponding one of the engaging recess parts 37A of the hub 37. Moreover, each of the outer-end round engaging portions 39B disengages from the corresponding one of the engaging recess parts 35A of the pulley 35. Therefore, power is not transmitted from the pulley 35 to the rotation transmission plate 37. Consequently, the power transmission mechanism is protected.

Furthermore, still another power transmission mechanism (hereinafter sometimes referred to as a third conventional mechanism) for use in a compressor, which is described in Japanese Unexamined Patent Publication (JP-A) No. 135752 of 1996, will be described hereunder by referring to FIGS. 3A and 3B.

An inner ring of a ball bearing 53 is fixed on a cylindrical projection portion 52A of a front housing 52 of a compressor 51. Further, a rotor 54 is fixed to the outer ring of the ball bearing 53. Moreover, a pulley 55 is fixed to the rotor 54. Furthermore, pins 56 are press-fitted into and fixed to holes 54A bored in the rotor 54 at three places located on the circumference x thereof. An elastic ring element 57 made of various kinds of rubber is fitted into and fixed to each of the pins 56. A second hub 61 is secured by three rivets 62 to the flange 59A of a first hub 59 which is fixed to a shaft 58 of the compressor 51 with a nut 60. Holding members 63 are secured onto the second hub 61 at three places, respectively. Further, each of the holding members 63 consists of a pair of holding pieces 63A and 63B. Further, the interval A between the exit-opening-side portions, which are placed forward in the direction R of rotation of the pulley 55, of the holding pieces 63A and 63B of each pair is set in such a manner as to be narrower than the interval B between the entrance-opening-side portions, which are placed rearward in the direction R, of the holding pieces 63A and 63B of the same pair. Moreover, each of the elastic ring elements 57 is sandwiched by a corresponding pair of the holding pieces 63A and 63B.

When the compressor 51 is normally operated, power is transmitted from an engine through the pulley 55, the rotor 54, the pins 56, the elastic ring elements 57, the second hub 61 and the first hub 59 to the shaft 58. Thus, the compressor 51 operates. At that time, the elastic ring elements 57 also perform the action of absorbing a variation in torque.

In contrast, when an abnormality occurs, for example, when the compressor 51 is locked, each of the elastic ring elements 57 is elastically deformed and passes through an exit-side opening part formed between the exit-opening-side portions of the pair of the holding pieces 63A and 63B. Thus, the transmission of power is interrupted.

The aforementioned first conventional mechanism has drawbacks in that repeated stress is produced in the destructible elements, which are destructed by overload, by driving the compressor, that it is, thus, difficult to maintain a destruction torque at a constant value and that the destruction torque decreases with time.

The aforesaid second conventional mechanism has drawbacks in that the number of components thereof is large, that the configuration thereof is complex, that because the drive levers are long, it is difficult to reduce a pulley diameter, and that because bending stress is applied to the drive levers by driving the compressor, it is difficult to suitably design the drive levers.

In the case of the aforementioned third conventional mechanism, when the torque excesses the predetermined value, each of the elastic ring elements is deformed and passes through the exit-side opening part formed in the holding member. Thus, the power transmission is interrupted. However, the loci of the elastic ring elements are on the same circumference. Thus, even when an elastic ring element once passes through the exit-side opening part of the holding member, another elastic ring element may enter the holding member from an entrance-side opening thereof. As a result, some power is transmitted to the shaft. Therefore, the reliability in interrupting the transmission of power is low. Further, each time when each of the elastic ring elements is brought into contact with and is detached from the holding member, noises and vibrations are generated. Moreover, because it is difficult for each of the elastic ring elements to enter the holding member from the exit-side opening thereof, power can be transmitted only in an orientation.

SUMMARY OF THE INVENTION

Accordingly, it is an object of the present invention to provide a power transmission mechanism which completely interrupts power transmission when a torque exceeds a predetermined value.

Further, another object of the present invention is to provide a power transmission mechanism whose structure is simple and cost is low.

Moreover, still another object of the present invention is to provide a bidirectionally rotatable power transmission mechanism.

To achieve the foregoing objects, in accordance with the present invention, there is provided a power transmission mechanism that comprises: a pulley having a holding portion; a hub which is placed concentrically with the aforesaid pulley and fixed to a shaft and has a holding part; and an elastic member adapted to be able to perform and interrupt power transmission between the aforesaid pulley and the aforesaid hub, wherein the aforesaid elastic member is accommodated in such a way as to extend over both of the aforesaid holding portion and aforesaid holding part if a torque is not more than a predetermined value, and wherein the aforesaid elastic member passes through a restriction portion provided in one of the aforesaid holding portion and aforesaid holding part in a radial direction and is then accommodated in an inner portion provided in one of the aforesaid holding portion and aforesaid holding part if the torque exceeds the predetermined value.

DESCRIPTION OF THE PREFERRED EMBODIMENT

Hereinafter, a preferred embodiment of the present invention will be described in detail by referring to FIGS. 4A to 6C.

Figure 1B:
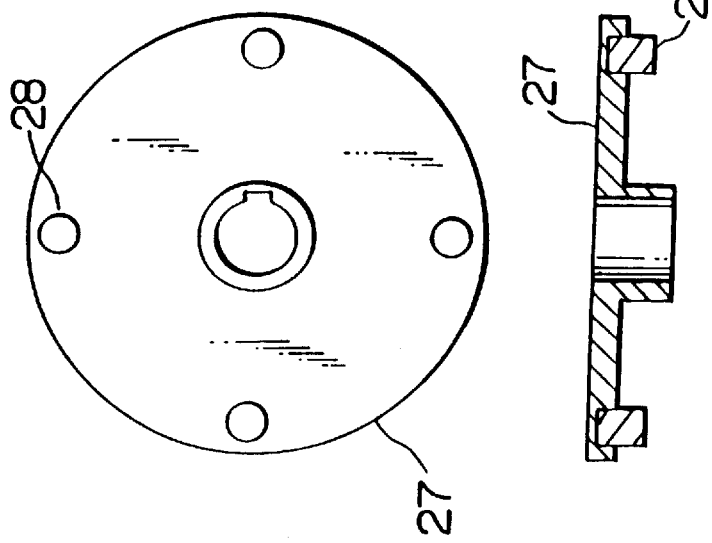
FIG. 1B is a front view of a primary portion of the first conventional power transmission mechanism of the compressor.
Figure 1C:
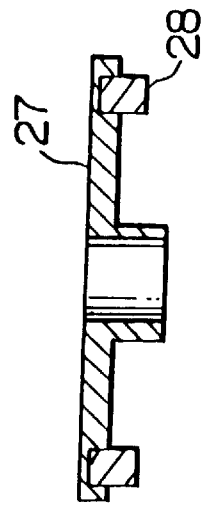
FIG. 1C is a sectional view of the primary portion of the first conventional power transmission mechanism of the compressor.
Figure 1A:
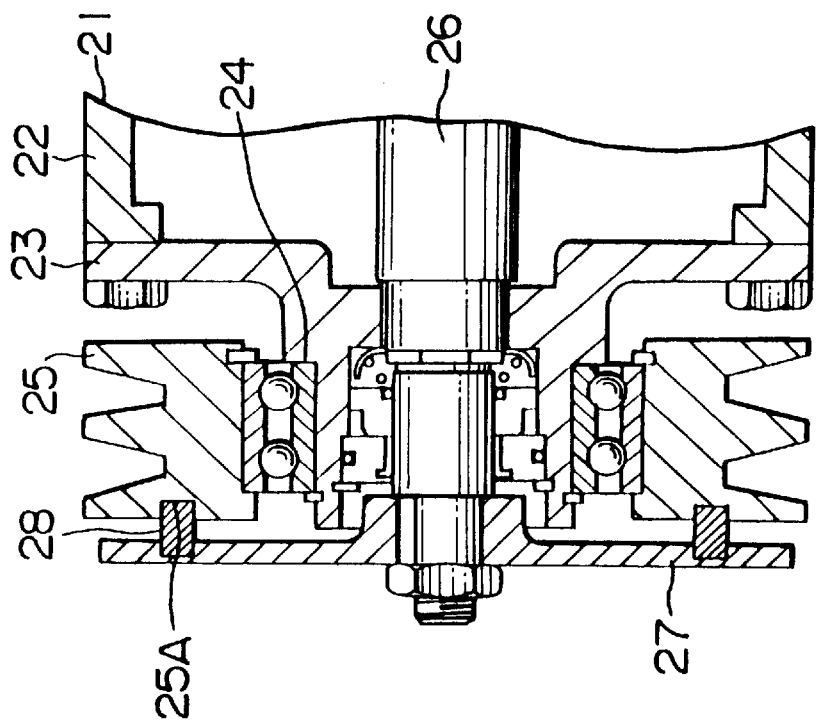
FIG. 1A is a sectional view of a first conventional power transmission mechanism of a compressor.
Figure 2B:
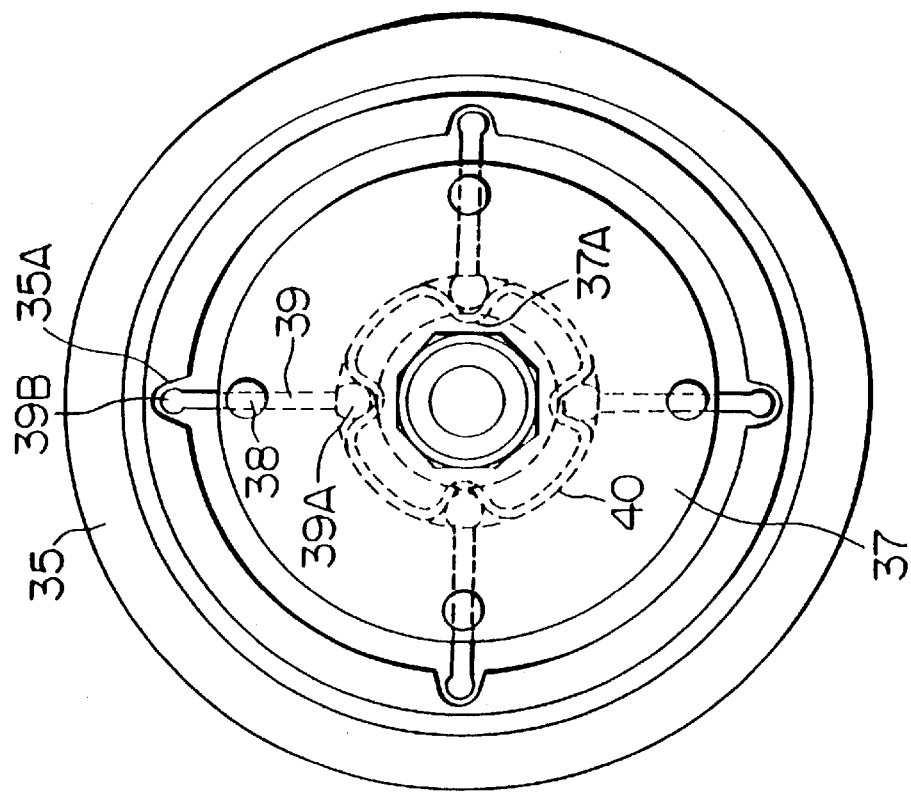
FIG. 2B is a front view of the second conventional power transmission mechanism of the compressor.
Figure 2A:
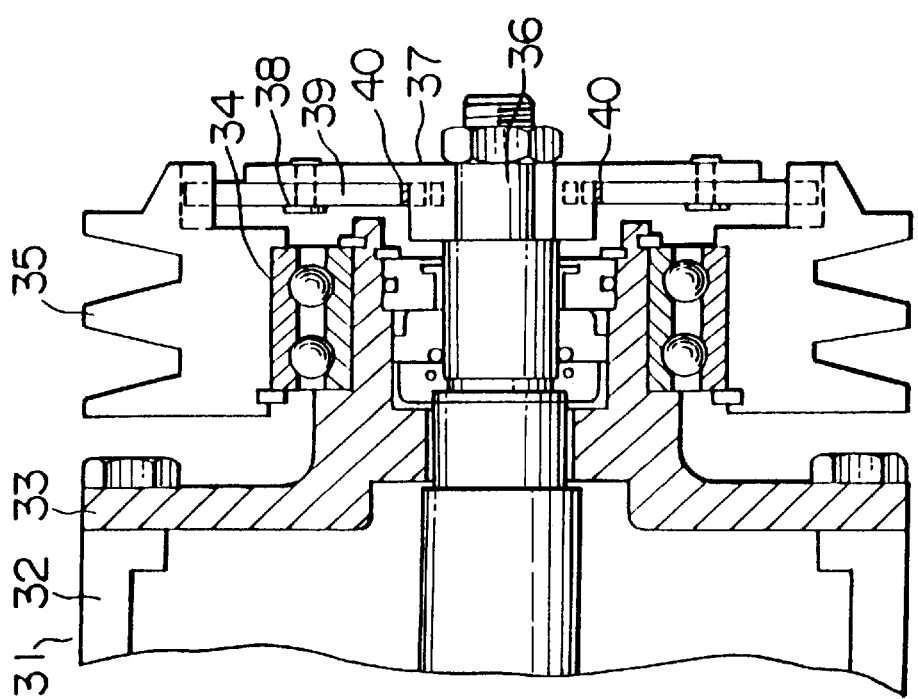
FIG. 2A is a sectional view of a second conventional power transmission mechanism of a compressor.
Figure 3B:
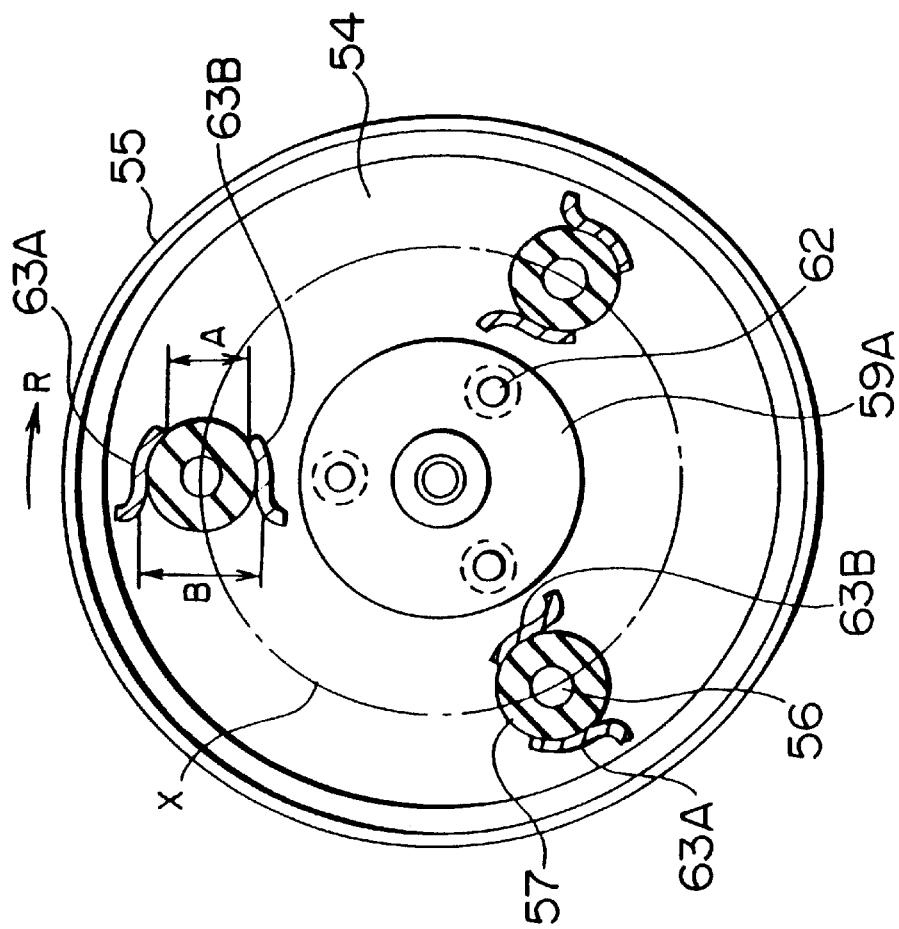
FIG. 3B is a front view of the third conventional power transmission mechanism of the compressor.
Figure 3A:
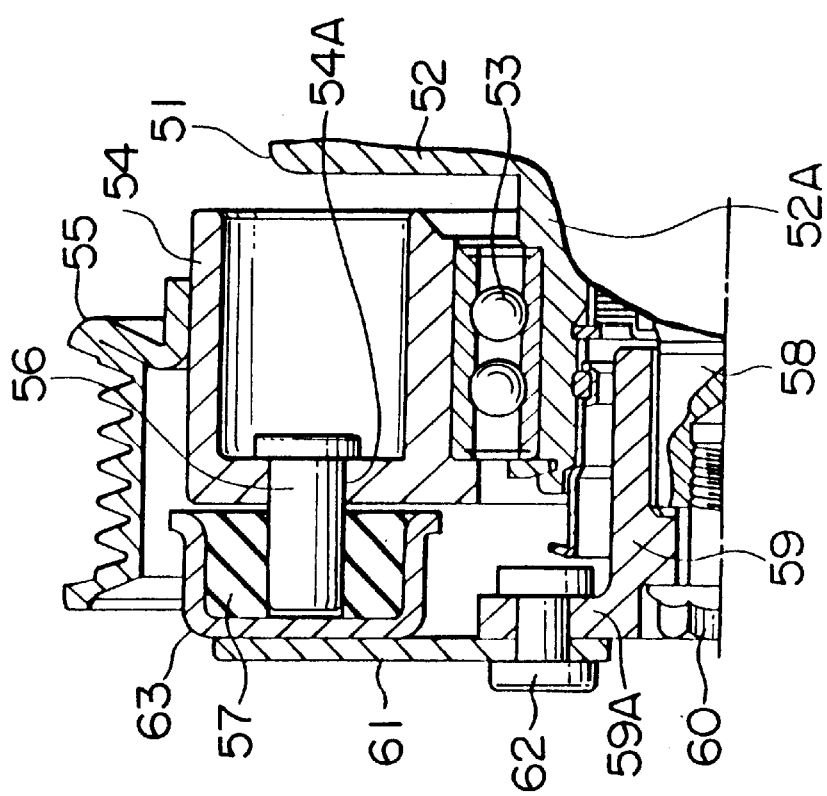
FIG. 3A is a sectional view of a third conventional power transmission mechanism of a compressor.
Figure 4A:
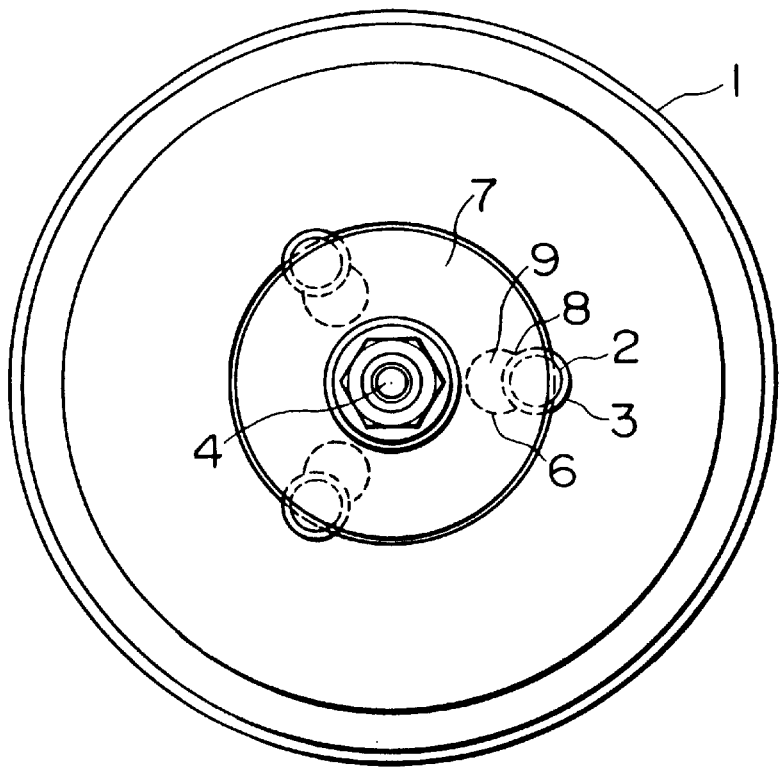
FIG. 4A is a front diagram showing a state where a power transmission mechanism, which is an embodiment of the present invention, transmits power.

Holding portions 3 respectively holding three disk-like elastic members 2 are provided at 120-degree intervals around a shaft 4 as viewed in FIG. 4A in the vicinity of a place at which an inner peripheral surface and a side surface of a pulley 1 intersect with each other. The pulley 1 is rotatably supported on a casing 12 of a compressor 11 by a bearing 13.

The shaft 4 is rotatably supported on the casing 12 of the compressor 11 by a bearing 14. Further, a hub 5 is fixed to the shaft 4. Further, holding parts 6 respectively holding three disk-like elastic members 2 are provided at 120-degree intervals around the shaft 4 as viewed in FIG. 4A in the vicinity of a place at which an inner peripheral surface and a side surface of the hub 5 intersect with each other.

Figure 4B:
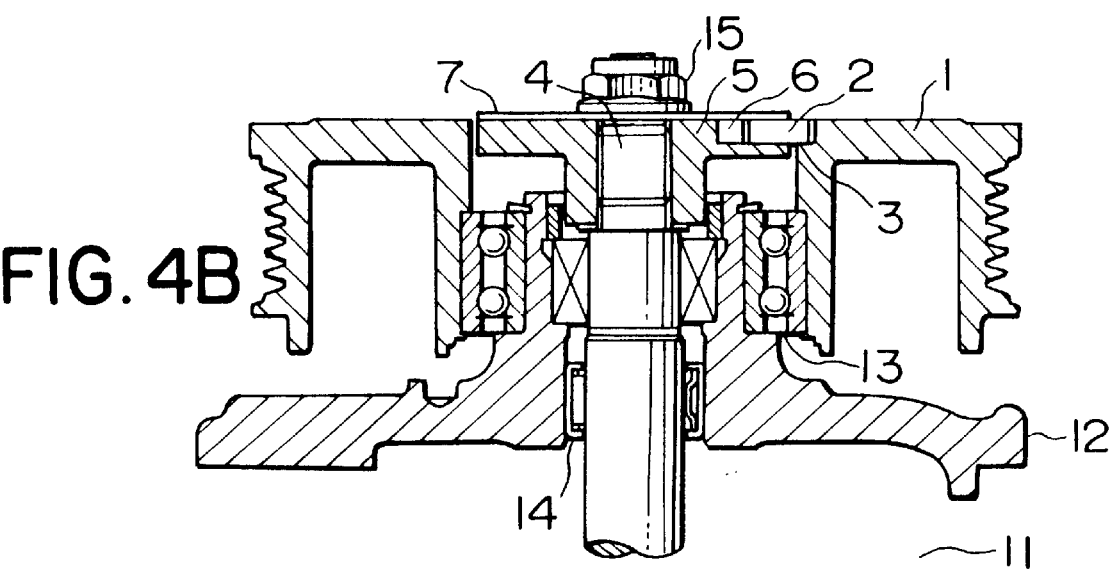
FIG. 4B is a sectional diagram showing the state where the power transmission mechanism, which is the embodiment of the present invention, transmits power.

When a torque, whose magnitude is not more than a predetermined value, is normally transmitted from the pulley 1 to the shaft 4, each of the three elastic members 2 is accommodated in such a manner as to extend over both of a corresponding one of the holding portions 3 of the pulley 1 and a corresponding one of the holding parts 6 of the hub 5, as illustrated in FIGS. 4A and 4B. Moreover, a holding disk 7 is fixed to the shaft 4 by a nut 15 with the intention of preventing the three elastic members 2 from popping out in the direction of the shaft 4.

When a clockwise torque is applied to the pulley 1 from an external drive source as viewed in FIG. 4A, the torque is transmitted to the shaft 4 through each of the elastic members 2 and the hub 5.

When an excessive torque, whose magnitude exceeds the predetermined value, is applied to the pulley 1, the deformation of each of the elastic members 2 is gradually enhanced by a compressive force applied from the pulley 1 in a radial direction, so that each of the elastic members 2 moves in the radial direction. Then, each of the elastic members 2 further advances and is detached from a corresponding one of the holding portions 3 of the pulley 1. Subsequently, each of the elastic members 2 passes through a restriction portion 8 provided in a corresponding one of the holding part 6 of the hub 5. Finally, each of the elastic members 2 is accommodated in the inner portion 9 of the corresponding one of the holding part 6. Consequently, the transmission of the torque from the pulley 1 to the hub 5 is completely interrupted.

Each of the elastic members 2 is accommodated in the inner portion 9 of the corresponding one of the holding part 6 and is thus caught by the restriction portion 8 provided in the corresponding one of the holding part 6. Therefore, each of the elastic members 2 cannot get out of the inner portion 9 of the corresponding one of the holding part 6. Consequently, each of the elastic members 2 cannot be brought into contact with the pulley 1 which rotates.

Figure 5:
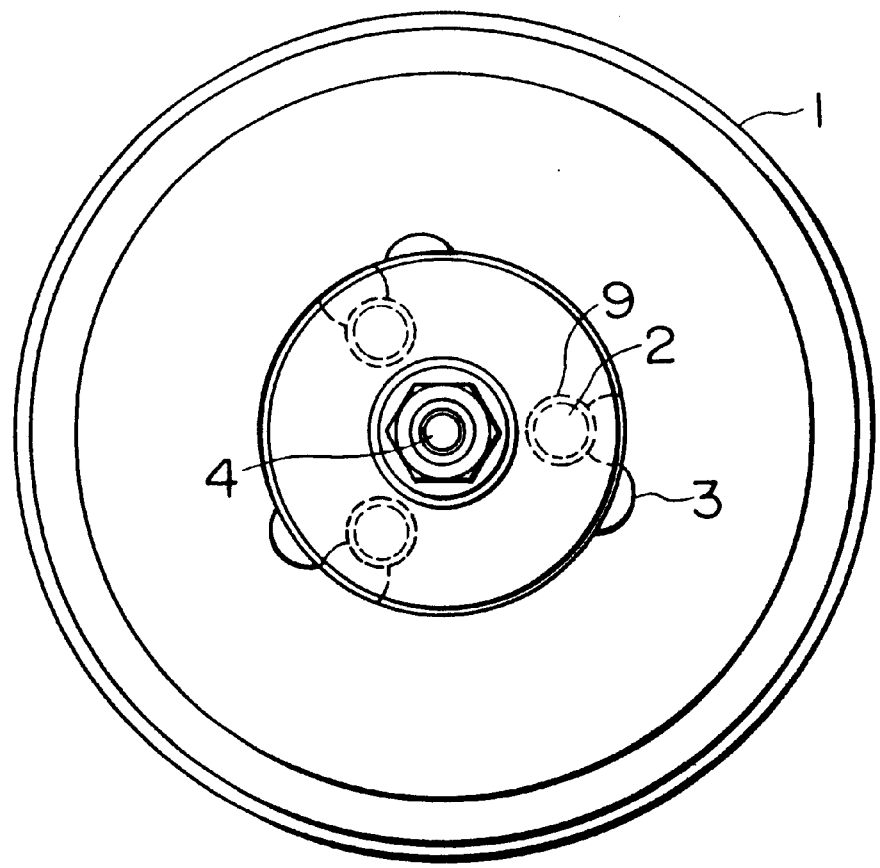
FIG. 5 is a front diagram showing a state where the power transmission mechanism, which is the embodiment of the present invention, interrupts the transmission of power.

A state, in which a torque is transmitted as shown in FIGS. 4A and 4B, is restored from a state, in which transmission of a torque is interrupted as illustrated in FIG. 5, by detaching the nut 15 and the holding disk 7 from the shaft 4 after stopping the pulley 1, and then moving each of the elastic members 2 from the corresponding one of the inner portion 9 of the holding part 6 to a position where such an elastic member 2 extends over both of the corresponding one of the holding parts 6 and the corresponding one of the holding portions 3 of the pulley 1.

Figure 6A:
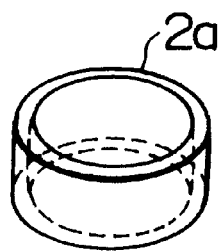
FIG. 6A is a perspective view of a first elastic member employed in the power transmission mechanism which is the embodiment of the present invention.
Figure 6B:
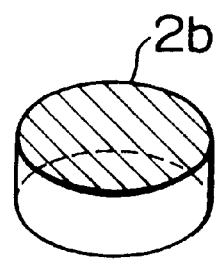
FIG. 6B is a perspective view of a second elastic member employed in the power transmission mechanism which is the embodiment of the present invention.
Figure 6C:
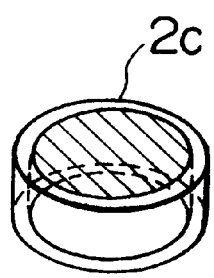
FIG. 6C is a perspective view of a third elastic member employed in the power transmission mechanism which is the embodiment of the present invention.

Referring to FIGS. 6A through 6C, the elastic member 2 may be an elastic member 2a comprising a hollow cylindrical metal tube (FIG. 6A), an elastic member 2b comprising a solid cylindrical rubber rod (FIG. 6B), or an elastic member 2c comprising a combination of a hollow cylindrical metal tube and a solid cylindrical rubber rod fitted therein (FIG. 6C).

In the foregoing embodiment, the restriction portion 8 and the inner portion 9 are provided in the holding part 6 of the hub 5. Alternatively, the restriction portion and the inner portion may be provided in the holding portion 3 of the pulley 1. Moreover, although the number of the elastic members 2 is three in the foregoing embodiment, the design of the mechanism may be altered by changing the number of the elastic members into a desired number. Furthermore, the elastic members 2 may be of a solid prismatic or a hollow prismatic shape instead of a solid cylindrical or a hollow cylindrical shape.

As is apparent from the foregoing description, in accordance with the present invention, the following advantageous effects of the present invention can be obtained.

(1) In case where the magnitude of a torque exceeds a predetermined value, each of the elastic members passes through the restriction portion provided in the holding portion of the pulley or in the holding part of the hub and is accommodated in the inner portion. Thus, the reliability in interrupting power transmission can be enhanced. Moreover, no noise, heat and vibration are produced.

(2) Torque can be transmitted in both of clockwise and counterclockwise directions.

(3) After interrupting the transmission of power, a state, in which the power transmission mechanism can transmit power, is restored by a simple operation. Further, the replacement of components is unnecessary. Therefore, the mechanism of the present invention is suitable for a power transmission mechanism with an overload protection function.

(4) The structure of the power transmission mechanism is simple. Further, the cost thereof is low.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A power transmission mechanism comprising:

a pulley having a holding portion;

a hub which is placed concentrically with said pulley and fixed to a shaft and has a holding part; and an elastic member adapted to be able to perform and interrupt power transmission between said pulley and said hub;

said elastic member being accommodated in such a way as to extend over both of said holding portion and said holding part if a torque is not more than a predetermined value;

said elastic member passing through a restriction portion provided in one of said holding portion and said holding part in a radial direction to be accommodated in an inner portion provided in one of said holding portion and said holding part if said torque exceeds said predetermined value.

2. A power transmission mechanism as claimed in claim 1, wherein said elastic member comprises a tubular metal element.

3. A power transmission mechanism as claimed in claim 1, wherein said elastic member comprises a columnar rubber element.

4. A power transmission mechanism as claimed in claim 1, wherein said elastic member comprises a combination of a tubular metal element and a columnar rubber element inserted therein.

* * * * *